(12) United States Patent
Tikhonov et al.

(10) Patent No.: US 10,918,990 B2
(45) Date of Patent: Feb. 16, 2021

(54) VERTICAL COLUMN APPARATUS FOR MASS EXCHANGE PROCESSES

(71) Applicants: Serguei Tikhonov, Bremen (DE); Lia Neumann, The Woodlands, TX (US)

(72) Inventors: Serguei Tikhonov, Bremen (DE); Lia Neumann, The Woodlands, TX (US); Yusub Ishangulyyev, Ashgabat (TM)

(73) Assignees: Serguei Tikhonov, Bremen (DE); Lia Neumann, The Woodlands, TX (US)

( * ) Notice: Subject to any disclaimer, the term of this patent is extended or adjusted under 35 U.S.C. 154(b) by 0 days.

(21) Appl. No.: 16/662,469

(22) Filed: Oct. 24, 2019

(65) Prior Publication Data
US 2020/0129918 A1 Apr. 30, 2020

(51) Int. Cl.
*B01D 53/14* (2006.01)
*B01D 53/18* (2006.01)
*C01B 7/14* (2006.01)

(52) U.S. Cl.
CPC ....... *B01D 53/185* (2013.01); *B01D 53/1418* (2013.01); *C01B 7/14* (2013.01); *B01D 2251/304* (2013.01); *B01D 2251/604* (2013.01)

(58) Field of Classification Search
CPC .............. B01D 53/185; B01D 53/1418; B01D 2251/304; B01D 2251/604; C01B 7/14
See application file for complete search history.

(56) References Cited

U.S. PATENT DOCUMENTS

| | | | | |
|---|---|---|---|---|
| 3,428,423 A | * | 2/1969 | Egbert | C01B 7/093 423/481 |
| 3,916,021 A | * | 10/1975 | Hajek | B01D 3/008 261/97 |
| 4,400,183 A | * | 8/1983 | Henrich | B01D 53/14 376/314 |
| 5,302,361 A | * | 4/1994 | Nagl | B01D 53/18 261/DIG. 72 |
| 8,496,815 B2 | | 7/2013 | Brix et al. | |
| 2010/0119438 A1 | | 5/2010 | Becker et al. | |
| 2014/0271420 A1 | * | 9/2014 | Kirchman | B01D 53/18 423/210 |

* cited by examiner

*Primary Examiner* — Cabrena Holecek
(74) *Attorney, Agent, or Firm* — Renner, Otto, Boisselle & Sklar, LLP

(57) ABSTRACT

The present invention relates to a vertical column apparatus (1) for mass exchange processes in the chemical, oil or gas industry and in particular, for the production of iodine from formation water of oil and gas fields, comprising:

a gas outlet (2) at the top and a liquid outlet (3) at the bottom of the column (1);

a packed section (4) between the top and the bottom of the column (1), wherein the column (1) has a liquid inlet (5) above the packed section (4) and a gas inlet (6) below the packed section (4), wherein an upper portion (7) of the column (1) has a larger diameter ($d_u$) compared to a diameter ($d_p$) of the packed section (4).

8 Claims, 1 Drawing Sheet

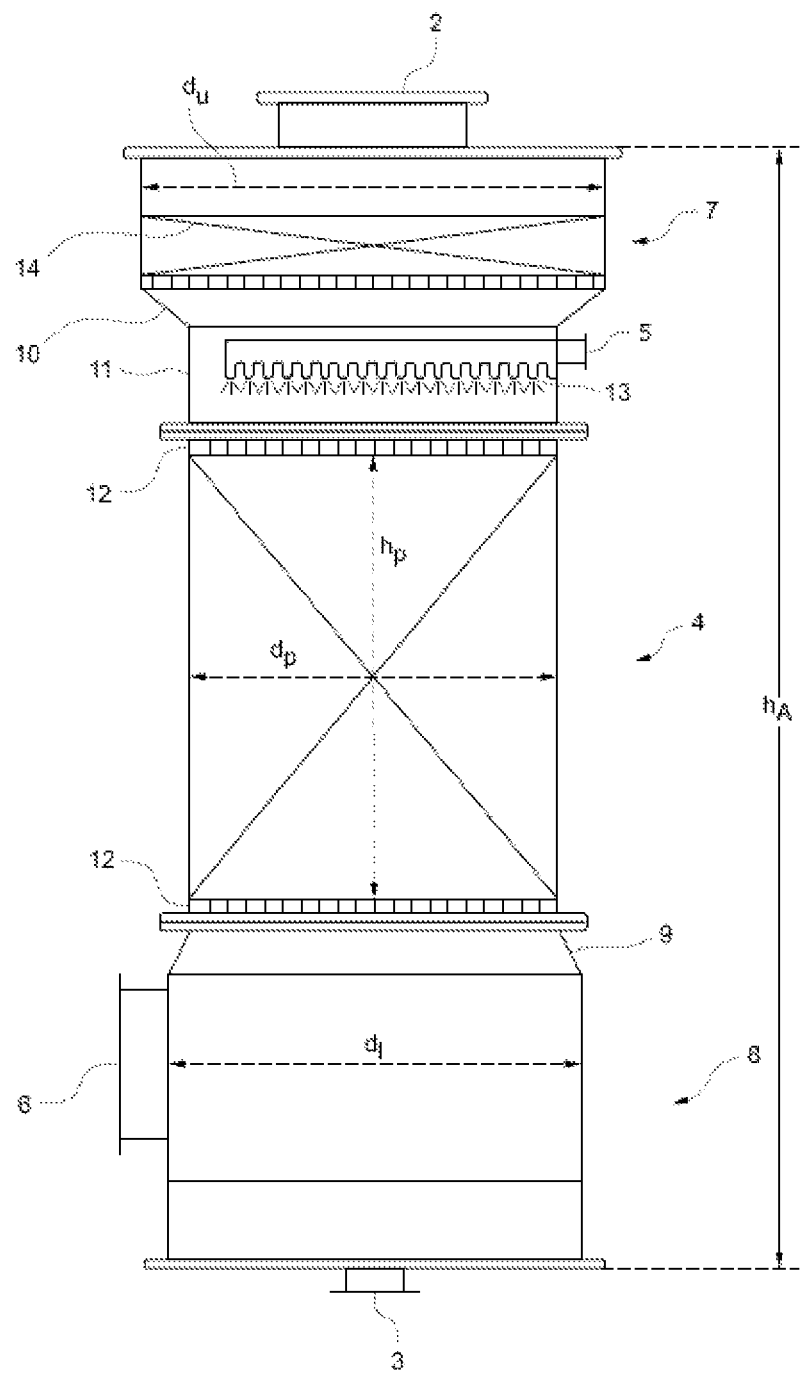

VERTICAL COLUMN APPARATUS FOR MASS EXCHANGE PROCESSES

The present invention relates to a vertical column apparatus for mass exchange processes in the chemical, oil or gas industry and in particular, for the production of iodine from formation water of oil and gas fields using the method of air-desorption.

BACKGROUND OF THE INVENTION

Currently, titanium absorption columns with a total height of 16 m and a packed layer of 8-9 m height are used in the iodine industry as the common mass exchange devices for iodine absorption by air. A disadvantage is that these devices are very large and therefore costly due to the large amount of material required. Further, feeding iodine-air mixture under high linear velocities between 3.5-4.5 m/sec to the lower part of the absorber at low density of the packing irrigation with sorbent (8-10 $m^3/m^2$) leads to significant amounts of iodine sorbent escaping with the outgoing gas flows into the exhaust pipe. Therefore, common absorber designs include an external spray deflector, which is installed in front of the exhaust pipe. Furthermore, when using alkaline sorbent as a iodine sorbent containing caustic sodium, sodium iodide and sodium iodate, with a concentration of caustic sodium within the pH range of 9 to 11, rapid clogging of the packing with sodium and calcium salts occurs at the absorption stage. Removing the clogging makes frequent interruptions of the production process necessary. This reduces the productivity of the iodine plant.

It is therefore the object of the invention to develop an absorption column in such a way that a periodic cleaning of the surface of the packing from salt deposits with cleaning solutions is allowed when the absorber is running in an emulsified mode. It is another object of the invention to provide a solution for operating an absorption column such that the escape of iodine sorbent with gas vapor from the upper part of the absorber is prevented without the necessity of the use of a spray deflector at the outlet of the absorber. It is a further object of the invention to provide an absorption column which has smaller dimensions and is less costly by maintaining a degree of iodine absorption of 98-99%.

DESCRIPTION OF THE INVENTION

The problem is solved by the features of the independent claims. Further advantageous configurations are described in the dependent claims.

The vertical column apparatus according to the invention for mass exchange processes in the chemical, oil or gas industry and in particular, for the production of iodine from formation water of oil and gas fields, comprises a gas outlet at the top and a liquid outlet at the bottom of the column; a packed section between the top and the bottom of the column, wherein the column has a liquid inlet above the packed section and a gas inlet below the packed section, wherein an upper portion of the column has a larger diameter compared to a diameter of the packed section. The packed section of the vertical column apparatus may be filled with a packing material. Increasing the diameter of the absorption column in its upper portion by, for example 0.5 meters, reduces the linear speed of iodine and air mixture in the upper portion of the column to 1.5-1.9 meters/sec. Therefore, the possibility of sorbent spray escaping from the upper part of the column into the atmosphere is eliminated. As a consequence, no external spray deflector needs to be installed in front of the exhaust pipe of the absorber. The absorption column according to the invention therefore has significantly smaller dimensions in comparison with existing devices. This allows a height of the packing layer of only 5 meters and a low linear velocity of iodine-air mixture of about 2.0-2.5 meters/sec in the mass transfer device to provide a degree of iodine absorption of 98-99%. The main indicator characterizing the efficiency of the iodine desorption process is the degree (%) of elementary iodine regeneration. The degree of iodine regeneration depends on many factors: temperature of the heated formation water, [temperature of the] air, airflow rate, distribution of air and drilling water, type of packing, surface of the mass transfer ($m^2/m^3$) and the ratio of air to the amount of formation oil water supplied to the vertical column apparatus.

The diameter of the upper portion of the column can be increased by preferably at least 0.1 m, more preferably by at least 0.3 m, still more preferably by at least 0.5 m compared to the diameter of the packed section.

Further, the packed section can have a diameter of preferably 2-4 m, more preferably 2.5-3.5 m, still more preferably 3.1 m. Depending on the selected diameter of the packed section, the larger diameter of the upper section compared to the packed section can be selected such, that leakage of iodine from the exhaust pipe can be effectively prevented.

Preferably, the packed section can be filled with a layer of packing material, wherein the height of the packing layer can preferably be less than 8 m, more preferably less than 6 m, still more preferably 5 m or less.

Also, a lower portion can be arranged below the packed section, wherein the lower portion can have a diameter of preferably 2-5 m, more preferably 3-4 m, still more preferably 3.5 m. The lower portion may comprise the gas inlet. The lower portion may comprise the liquid outlet. In particular, the liquid outlet may be located below the gas inlet. The lower portion can be used in particular for the purpose of ensuring that the gas flows uniformly against the packed section. The lower portion can also be used to collect the sorbent that has flowed through the packed section and to discharge it in a controlled manner via the liquid outlet.

Furthermore, a tapered section can be arranged between the lower portion and the packed section, tapering from the diameter of the lower portion to the diameter of the packed section. The tapered section can be conical, in particular. The tapered section can have a circular cross section. The tapered section can be formed in one piece with the lower portion. The tapered section can be connected to the packed section via a flange connection.

In addition, a widening section can be arranged between the packed section and the upper portion, widening from the diameter of the packed section to the diameter of the upper portion. The widening section can be conical, in particular. The widening section can have a circular cross section.

Beyond that, an intermediate section can be arranged directly above the packed section, wherein the liquid inlet is arranged at the intermediate section. The intermediate section can have the same diameter as the packed section. The packed section and the intermediate section can in particular have a cylindrical hollow body each. The intermediate section can be connected to the packed section via a flange connection.

In addition, the total height of the vertical column apparatus can be preferably less than 16 m, more preferably less than 13 m, still more preferably 12 m or less. Compared to known titanium iodine industrial air iodine absorption devices with a height of 16 meters and a height of 8-9 meters of the packing layer, the vertical column apparatus according to the invention therefore has a reduced total height and a reduced height of the packing layer, which compared to the commonly used devices can reduce the cost of a new device by 40-50%.

Furthermore, the column material can comprise titanium and/or fiberglass.

Also, gridirons each can be positioned adjacent to the top of the packed section and to the bottom of the packed section. In particular, the gratings can fulfil the function of securing the packing material in the packed section in such a way that it cannot be displaced. A further gridiron can be positioned in the upper portion 7 directly above the widening section 10 to fix an internal spray deflector 14 in place.

For example, the packing material of the packed section can be a double thread polyethylene packing. The packing can have a volume of 75 mm×1000 mm. The packing material can comprise different layers and/or materials. The packed section can be filled with random dumped packing or with structured packing sections, which are arranged or stacked. Packing offers the advantage of a lower pressure drop across the column. Differently shaped packing materials can have different surface areas and void space between the packing.

Furthermore, the column can comprise a liquid distributor to distribute the liquid over the surface of the packed section, the liquid distributor can be connected to the liquid inlet. The liquid distributor can be arranged horizontally in the intermediate section. The liquid distributor can have the same cross sectional shape as the intermediate section.

In addition, a spray deflector can be arranged in the upper portion. The spray deflector can be fixed in place via a gridiron.

The invention also concerns a method of producing iodine, in particular from formation water of oil and gas fields, comprising the steps:

feeding of iodine-air mixture at a linear speed of 3.5-4.5 m/sec to a gas inlet of an vertical column apparatus;

passing the iodine-air mixture through a packed section of the vertical column apparatus at a linear speed of 2.0-2.5 m/sec;

passing the iodine-air mixture through the top of the column at a linear speed of 1.5-1.9 m/sec, thereby preventing the escape of iodine sorbent with gas vapor from the upper portion of the vertical column apparatus.

The top of the column can have an increased diameter compared to the packed section. The diameter of the top of the column can be increased by preferably at least 0.1 m, more preferably by at least 0.3 m, still more preferably by at least 0.5 m compared to the diameter of the packed section.

The method can be carried out by means of a vertical column apparatus as described above.

The temperature of the air flow may be from 15 to 40° C., preferably from 18 to 30° C., preferably from 18 to 25° C. The air flow may have an ambient temperature.

The process may be carried out with an airflow rate in the range 90 to 200, alternatively from 105 to 150 m$^2$/m$^3$, with respect to the total volume of the aqueous solution.

A water density of the packing may be 8 to 10 m$^3$/m$^3$, with respect to the vertical column apparatus cross-section square.

Further characteristics, advantages and features of the invention are indicated in the following description of preferred embodiments of the invention by means of the accompanying drawing in which show:

FIG. 1 a side view of an embodiment of the vertical column apparatus according to the invention.

FIG. 1 shows a side view of the vertical column apparatus 1, comprising several segments, from the bottom to the top a lower portion 8, the packed section 4, an intermediate section 11 and an upper portion 7. The apparatus can be formed of pipes of sheet metal, preferably titanium. The segments can also comprise fiberglass. The particular segments of the vertical column can preferably have a circular cross section, whereby different shapes of cross sections are possible. The lower portion 8 can be connected to the packed section 4 via a flange connection. Also the intermediate section 11 can be connected to the packed section 4 via a flange connection. There is a tapered section 9 arranged between the lower portion 8 and the packed section 4 which compensates for the diameter decrease between the lower portion 8 having diameter d$_1$ and the packed section 4 having diameter d$_p$. A widening section 10 can is positioned between the intermediate section 11 and the upper portion 7 which compensates for the diameter increase between the packed section 4/intermediate section 11 having the diameter d$_p$ and the upper portion 7 having the diameter d$_u$. A liquid outlet 3 is arranged at the downside surface of the lower portion 8, where alternatively this outlet 3 could also be arranged aside at circumference at the downside border of the lower portion 8. The gas inlet 6 leads laterally into the lower portion 8 and is in any case located above the liquid outlet 3. In the depicted embodiment, the diameter of the lower portion 8 is d$_1$=3.5 m.

In FIG. 1 the total height of the lower portion 8 and the tapered section 9 is between 2.8 m and 2.9 m. The packed section 4 has a height of 4.1 m-4.3 m and a diameter of 3.1 m in the embodiment shown and is filled with a packing material, for example a double thread polyethylene packing. In the edge areas of the packed section 4, gratings 12 are arranged on the top and bottom sides, each of which lies horizontally in the cross-sectional plane. In particular, the gratings 12 can fulfil the function of securing the packing material in the packed section 4 in such a way that it cannot be displaced. Above the packed section 4 an intermediate section 11 is flanged to the packed section 4. The intermediate section 11 has the same diameter as the packed section 4 and also forms a cylindrical hollow cylinder made of titanium sheet. The intermediate section 11 contains an irrigation unit 13 which is connected to a liquid inlet 5 which opens laterally into the intermediate section 11. The irrigation unit 13 distributes the sorbent over the cross-sectional area of the packed section 4. The conically shaped widening section 10 widens the diameter d$_p$ of the intermediate section 11 to the diameter d$_u$ of the upper portion 7, which has a diameter of about 3.9 to 4 m in the depicted embodiment. Due to the enlarged diameter d$_u$ of the upper portion by, for example 0.5 meters, the linear speed of iodine and air mixture in the upper portion 7 of the column is reduced to 1.5-1.9 meters/sec. A gas outlet 2 respectively an exhaust pipe 2 is positioned on the top of the upper portion 7. Alternatively, the exhaust pipe 2 can also be arranged at the circumference of the upper portion 7 and next to the top. The bottom of the lower portion 8 and the top of the upper portion 7 are closed with a lid each, the lids comprising the gas outlet 2 on one hand and the liquid outlet 3 on the other hand. The upper portion can comprise an internal spray deflector 14 which prohibits iodine from escaping the upper portion 7 via the exhaust pipe. The spray deflector 14 can be fixed into position via a grate 12 which can be arranged between the upper portion 7 and the widening section 10.

The total height $h_A$ of the vertical column apparatus as shown is about 9.40 m to 9.60 m.

The iodine/air mixture flows through the gas inlet 6 to the lower portion 8 of the absorber 1 and spreads in the process of its passing through the grate 12 and the packing layer in the packed section 4, then it is directed to the upper portion 7 of the absorption column 1. Against the iodine-air mixture—from top to the bottom—adsorbent flows down (sodium-hydroxide solution) from a sorbent circulation tank, by means of a centrifugal pump to the absorption column irrigator 13. Chemisorption processes take place on the surface of the packing between iodine and sodium hydroxide solutions. As the sorbent flows down, the sorbent is enriched with iodine and iodate (the total iodine content), and the iodine gets extracted from the air as it rises up the column. After iodine has been extracted (captured) from it, the air escapes to the atmosphere through the exhaust pipe 2.

The features disclosed in the foregoing description, in the claims and the accompanying drawings may, both separately or in any combination, be material for realizing the invention in diverse forms thereof.

REFERENCE LIST 1 vertical column apparatus
2 gas outlet
3 fluid outlet
4 packed section
5 fluid inlet
6 gas inlet
7 upper portion
8 lower portion
9 tapered section
10 widening section
11 intermediate section
12 gridiron
13 liquid distributor
14 spray deflector
$d_1$ diameter lower portion
$d_p$ diameter packed section
$d_u$ diameter upper portion
$h_p$ height packed section
$h_A$ vertical column apparatus

The invention claimed is:

1. Vertical column apparatus (1) for mass exchange processes in the chemical, oil or gas industry, comprising:
   a gas outlet (2) at a top and a liquid outlet (3) at a bottom of the column (1);
   a packed section (4) between the top and the bottom of the column (1), wherein the column (1) has a liquid inlet (5) above the packed section (4) and a gas inlet (6) below the packed section (4),
   wherein a diameter ($d_u$) of an upper portion (7) of the column (1) is increased by at least 0.3 m compared to a diameter ($d_p$) of the packed section (4),
   a spray deflector (14) arranged in the upper portion (7),
   a lower portion (8) arranged below the packed section, wherein a diameter ($d_l$) of the lower portion (8) is larger than the diameter ($d_p$) of the packed section (4),
   a tapered section (9) arranged between the lower portion (8) and the packed section (4), the tapered section (9) tapering from the diameter ($d_l$) of the lower portion (8) to the diameter of the packed section (4),
   a widening section (10) arranged between the packed section (4) and the upper portion (7), the widening section (10) widening from the diameter ($d_p$) of the packed section (4) to the diameter ($d_u$) of the upper portion (7),
   an intermediate section (11) arranged directly above the packed section (4), wherein the liquid inlet (5) is arranged at the intermediate section (11), the intermediate section having the same diameter as the packed section (4),
   wherein the intermediate section (11) contains an irrigation unit (13) which is connected to the liquid inlet (5), wherein the irrigation unit (13) distributes the sorbent over the cross-sectional area of the packed section (4).

2. Vertical column apparatus (1) according to claim 1, wherein the diameter ($d_u$) of the upper portion (7) of the column (1) is increased by at least 0.5 m compared to the diameter ($d_p$) of the packed section (4).

3. Vertical column apparatus (1) according to claim 1, wherein the packed section (4) has a diameter ($d_p$) of 2-4 m.

4. Vertical column apparatus (1) according to claim 1, wherein the packed section (4) is filled with a layer of packing material, wherein the height of the packing layer is less than 8 m.

5. Vertical column apparatus (1) according to claim 1, wherein the lower portion (8) having a smaller diameter ($d_l$) than the diameter ($d_u$) of the upper portion (7).

6. Vertical column apparatus (1) according to claim 1, wherein the total height of the vertical column apparatus (1) is less than 20 m.

7. Vertical column apparatus (1) according to claim 1, wherein the column material comprises titanium and/or fiberglass.

8. Vertical column apparatus (1) according to claim 1, wherein gridirons (12) each are positioned adjacent to the top of the packed section (4) and to the bottom of the packed section (4).

* * * * *